(12) United States Patent  (10) Patent No.: US 12,132,357 B2
 Altherr  (45) Date of Patent: Oct. 29, 2024

(54) ROTOR FOR AN ELECTRICAL MACHINE

(71) Applicant: Mahle International GmbH, Stuttgart (DE)

(72) Inventor: Patrick Altherr, Stuttgart (DE)

(73) Assignee: Mahle International GmbH (DE)

( * ) Notice: Subject to any disclaimer, the term of this patent is extended or adjusted under 35 U.S.C. 154(b) by 203 days.

(21) Appl. No.: 17/705,556

(22) Filed: Mar. 28, 2022

(65) Prior Publication Data

US 2022/0311296 A1    Sep. 29, 2022

(30) Foreign Application Priority Data

Mar. 26, 2021 (DE) .......................... 102021202994.9

(51) Int. Cl.
 *H02K 1/32*    (2006.01)
(52) U.S. Cl.
 CPC ....................... *H02K 1/32* (2013.01)
(58) Field of Classification Search
 CPC ........................................................ H02K 1/32
 USPC ............................................................. 310/61
 See application file for complete search history.

(56) References Cited

U.S. PATENT DOCUMENTS

| | | | | |
|---|---|---|---|---|
| 2007/0205686 A1* | 9/2007 | Ishida | .................... | H02K 1/276 |
| | | | | 310/43 |
| 2018/0191224 A1* | 7/2018 | Kötschau | ................. | H02K 9/10 |
| 2020/0186003 A1* | 6/2020 | Fröhlich | ................ | H02K 9/193 |
| 2022/0060072 A1 | 2/2022 | Michael | | |

FOREIGN PATENT DOCUMENTS

| | | | |
|---|---|---|---|
| DE | 102017214507 A1 | 2/2019 | |
| DE | 10 2018 221 569 A1 | 6/2020 | |
| JP | 2013055799 | * 3/2013 | ............... H02K 9/19 |
| JP | 5765149 B2 | 8/2015 | |
| JP | 2020162201 A | 10/2020 | |

OTHER PUBLICATIONS

English abstrac for JP-2020162201, Oct. 1, 2020.
English abstract for JP-5765149, Aug. 19, 2015.
German Search Report for DE-102021202994.9, dated Jun. 9, 2021, Sep. 29, 2022.

* cited by examiner

*Primary Examiner* — Terrance L Kenerly

(74) *Attorney, Agent, or Firm* — Fishman Stewart PLLC

(57) ABSTRACT

A rotor for an electrical machine may include a rotor shaft, a hollow inner shaft, two end discs, and at least one outlet opening for discharging cooling medium. The rotor shaft may be configured as a hollow shaft having an inner lateral surface. The inner shaft may be arranged in the rotor shaft and may include at least one opening at least in one axial center for ejecting cooling medium onto the inner lateral surface of the rotor shaft to cool the inner lateral surface. The two end disks may delimit an interior of the rotor shaft in an axial direction. Each of the two end disks may include a central through opening through which the inner shaft is guided. The at least one outlet opening may be disposed in at least one of (i) each of the two end disks and (ii) a lateral surface of the rotor shaft.

17 Claims, 2 Drawing Sheets

ROTOR FOR AN ELECTRICAL MACHINE

CROSS-REFERENCE TO RELATED APPLICATIONS

This application claims priority to German Patent Application No. DE 10 2021 202 994.9, filed on Mar. 26, 2021, the contents of which is hereby incorporated by reference in its entirety.

TECHNICAL FIELD

The present invention relates to a rotor for an electrical machine having a rotor shaft and a rotor core, wherein the rotor shaft is designed as a hollow shaft having an inner lateral surface. The invention also relates to an electrical machine having such a rotor.

BACKGROUND

DE 10 2018 221 569 A1 discloses a generic rotor for an electrical machine, comprising a rotor shaft having a rotor core, wherein the rotor shaft is designed at least in sections as a hollow shaft having an inner wall, and wherein a fluid lance for internal rotor cooling is introduced into the hollow shaft. The inner wall of the hollow shaft is equipped with an impact hump in order to improve distribution of the cooling fluid.

Modern electric motors or modern electrical machines in general have to be cooled in a targeted and cost-effective manner due to their high speeds or power, for which purpose internal rotor cooling is already known, for example. However, such internal rotor cooling is comparatively complex and therefore expensive.

SUMMARY

The present invention therefore relates to the problem of specifying and improved or at least alternative embodiment for a rotor of the generic type, which in particular overcomes the disadvantages known from the prior art.

This problem is solved according to the invention by the subject matter of independent claim(s). Advantageous embodiments are the subject matter of the dependent claim(s).

The present invention is based on the general concept of providing an internal rotor cooling for a rotor of an electrical machine, in particular an electric motor, wherein an inner shaft connected in a rotationally-fixed manner to the rotor shaft having at least one corresponding opening is provided for this purpose. The rotor according to the invention has a rotor shaft having a rotor core, for example a laminated core, wherein the rotor shaft in this case is designed as a hollow shaft having an inner lateral surface. According to the invention, a hollow inner shaft is now arranged in this hollow shaft, which has at least one opening at least in an axial center for ejecting cooling medium onto the inner lateral surface of the rotor shaft, and wherein two end disks are provided which delimit an interior space of the rotor shaft in the axial direction, wherein each end disk has a central passage opening through which the inner shaft is guided and held at the same time. Of course, multiple openings can also be provided. At least one outlet opening for discharging the cooling medium is/are provided in each end disk and/or in a lateral surface of the rotor shaft. By coupling the inner shaft guiding a cooling medium via the end disks onto the rotor shaft, a comparatively simple introduction of cooling medium into the rotor shaft and thus internal rotor cooling can be created, which also has significant advantages in terms of a seal, for example in comparison to a stationary fluid lance projecting into the interior of the rotor shaft, due to the fixing of the inner shaft on the two end disks provided according to the invention. The rotor shaft can therefore solely theoretically also be designed as a prefabricated assembly together with the two end disks and the inner shaft, which enables rapid installation of the rotor shaft in, for example, an electric motor.

A distribution element for distributing the cooling medium in the axial direction is expediently arranged on the inner lateral surface radially outside the at least one opening. When the rotor rotates rapidly and cooling medium is discharged via the at least one opening of the hollow inner shaft, the cooling medium is sprayed onto the inner lateral surface of the rotor shaft due to the centrifugal forces and distributed there by the distribution element in the axial direction. As a result, uniform cooling of the inner lateral surface and thus also uniform internal rotor cooling are possible. Furthermore, the cooling medium flows in the direction of the end disks and can leave the rotor shaft there again via the respective at least one outlet opening.

The valve element is expediently designed as a ring, in particular as a snap ring. A comparatively simple installation of the distribution element in the rotor shaft is possible via such a ring, in particular a snap ring. In addition, in the case of a snap ring it can be provided, for example, that an inwardly open annular groove is formed on the inner lateral surface of the rotor shaft, in which the distribution element engages at least partially and is held thereby. In this case, the distribution element designed as a snap ring could be compressed, inserted into the rotor shaft, and relieved in the area of the ring groove open on the inside, as a result of which the snap ring engages in the ring groove and is already reliably fixed there. A further installation or fixing step is therefore not necessary.

In a further advantageous embodiment of the rotor according to the invention, the distribution element is applied to the inner lateral surface of the rotor shaft by means of plastic injection molding. In this case, it is also comparatively easily possible to produce the distribution element by simply inserting a plastic injection molding lance into the rotor shaft and then injection molding the distribution element on the inner lateral surface of the rotor shaft. Alternatively, of course, it is also conceivable for a distribution element designed as a metal or plastic ring to be held in the rotor shaft via a press fit, so that such a distribution element only has to be pressed into the rotor shaft via a suitable installation aid.

Again alternatively, it can be provided that the rotor shaft is formed from two parts, which are connected to one another at the ends via a friction-welded connection, wherein a weld bead occurring upon the friction-welded connection forms the distribution element. This weld bead is removed on an outer lateral surface, while it forms the distribution element on the inner lateral surface. In this case, a separate installation of the distribution element would not be necessary.

Again alternatively, it can also be provided that the distribution element is produced by means of embossing or tapering. For this purpose, for example, embossing rollers can be guided along an outer lateral surface of the rotor shaft, wherein these deform the rotor shaft inwards due to radial pressure and the bulge thereby resulting on the inner lateral surface of the rotor shaft forms the subsequent distribution element.

Alternatively, the distribution element can also be designed as a pin leading through the rotor shaft, in particular as a heavy-duty roll pin. Such a pin can have a square cross section, for example, wherein at least two such pins, in particular even four such pins, are usually provided in order to avoid an imbalance in the rotor shaft.

The distribution element expediently has a triangular cross-sectional shape with an inwardly directed tip, a rounded cross-sectional shape, or an angular cross-sectional shape. In particular, the triangular cross-sectional shape having the tip pointing inwards, which deflects a flow of cooling medium striking the distribution element in the axial direction, offers the great advantage of uniform internal rotor cooling.

The at least one opening is expediently introduced into the inner shaft by means of drilling, stamping, or embossing. Even this non-exhaustive list gives an idea of the diverse possibilities for producing the at least one opening in the inner shaft, wherein solely theoretically even later adaptation by introducing further openings into the hollow inner shaft is possible.

In a further advantageous embodiment of the rotor according to the invention, the inner shaft is closed at an end disk by means of a plug. In this case, a supply of cooling medium into the hollow inner shaft is effectuated from only one side, while the other side is closed by means of the plug. This offers the great advantage that by building up a pressure of cooling medium in the inner shaft that can be controlled or regulated, a discharge quantity and thus a cooling capacity can be controlled or regulated.

The present invention is also based on the general concept of equipping an electrical machine with a rotor corresponding to the previous paragraphs. In this way, an electrical machine can be created that can be optimally cooled via internal rotor cooling and can thereby provide a higher power.

Further important features and advantages of the invention result from the dependent claims, from the drawings, and from the associated description of the figures with reference to the drawings.

It is understood that the features mentioned above and those yet to be explained below are usable not only in the combination specified in each case, but also in other combinations or alone, without departing from the scope of the present invention.

Preferred exemplary embodiments of the invention are illustrated in the drawings and are explained in more detail in the following description, wherein the same reference numerals refer to identical or similar or functionally identical components.

BRIEF DESCRIPTION OF THE DRAWINGS

In the respective schematic figures.

DETAILED DESCRIPTION

Figure 1:
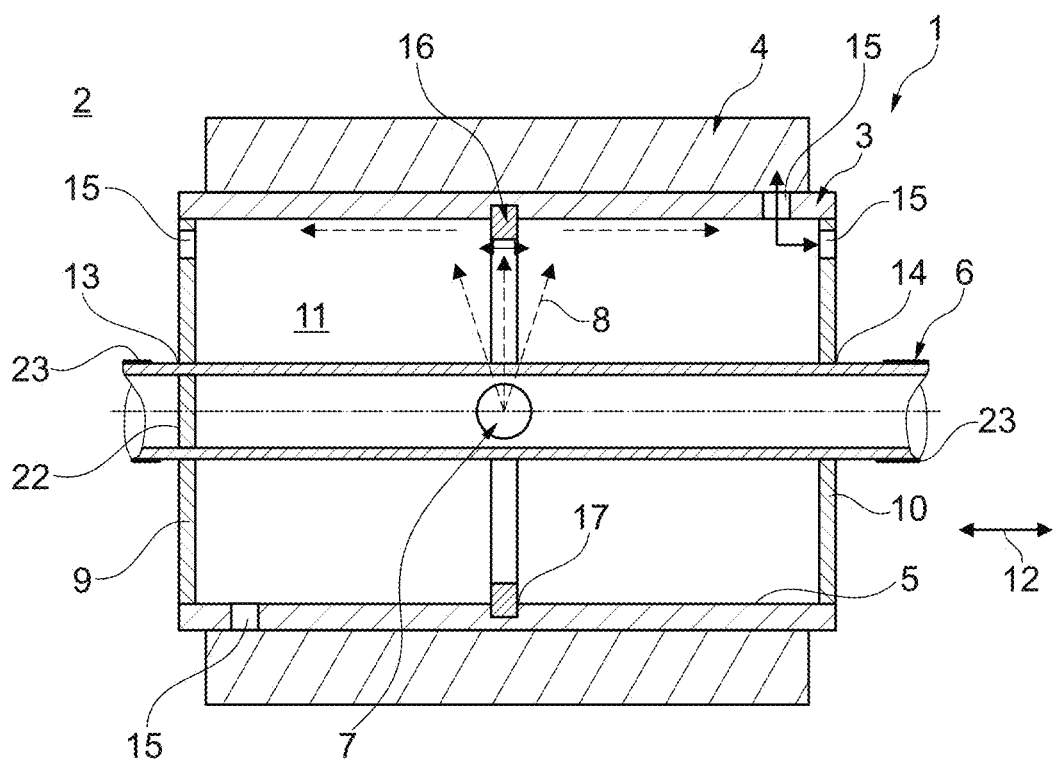
FIG. 1 shows a sectional view through a rotor according to the invention for an electrical machine according to the invention.
Figure 2:
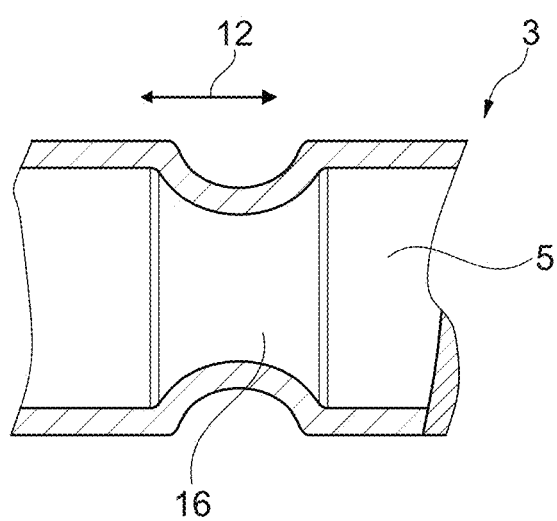
FIG. 2 shows a sectional view through a possible embodiment of a rotor shaft.

According to FIG. 1, a rotor 1 according to the invention for an electrical machine 2 (not otherwise shown), for example for an electric motor or a generator, has a rotor shaft 3 (cf. in particular also FIGS. 2 to 6), on the outer lateral surface of which a rotor core 4, for example a laminated core, is arranged. As can be seen from FIGS. 1 to 6, the rotor shaft 3 is designed as a hollow shaft having an inner lateral surface 5. According to the invention, a hollow inner shaft 6 is now arranged in the rotor shaft 3, which has at least one opening 7 at least in a center (viewed in the axial direction 12) for ejecting cooling medium 8 onto the inner lateral surface 5 of the rotor shaft 3. Also provided are two end disks 9 and 10, which delimit an interior 11 of the rotor shaft 3 in the axial direction 12 and wherein each end disk 9, 10 has a central through opening 13, 14 through which the inner shaft 6 is guided. In addition, at least one outlet opening 15 for discharging the cooling medium 8 is/are provided in each end disk 9, 10 and/or in a lateral surface of the rotor shaft 3. In general, it is therefore also possible for cooling medium 8 to be discharged via the rotor cores 4.

The rotor 1 according to the invention makes it possible to achieve internal rotor cooling and thus particularly uniform cooling of the rotor 1, as a result of which the performance of an electrical machine 2 equipped with this rotor 1 can be increased.

At least one distribution element 16 for distributing the cooling medium 8 in the axial direction 12 is arranged on the inner lateral surface 5 of the rotor shaft 3 radially outside the at least one opening 7. If cooling medium 8 exits the inner shaft 6 via its at least one opening 7 into the interior 11, the cooling medium is thus deflected in the axial direction 12 after it strikes the distribution element 16, so that preferably the entire inner lateral surface 5 of the rotor shaft 2 can be uniformly cooled.

The distribution element 16 can be designed as a ring, for example as a snap ring, wherein it is also conceivable that an annular groove 17 open to the inside is provided on the inner lateral surface 5 of the rotor shaft 3, in which the distribution element 16 at least partially engages and is also held therein. An annular groove 17 of this type can be very advantageous, in particular in the case of a distribution element 16 designed as a snap ring, since in this case for installation in the rotor shaft 3, the distribution element 16 only has to be slightly compressed, pushed to the axial center of the rotor shaft 3, and widens there in a self-locking manner in the annular groove 17.

If one considers FIG. 1, it can be seen that the distribution element 16 has an angular, in particular rectangular cross-sectional shape, wherein is also conceivable solely theoretically that the distribution element 16 has a triangular cross-sectional shape having an inwardly directed tip, which is used as a flow divider. A rounded cross-sectional shape is also solely theoretically conceivable.

Figure 4:
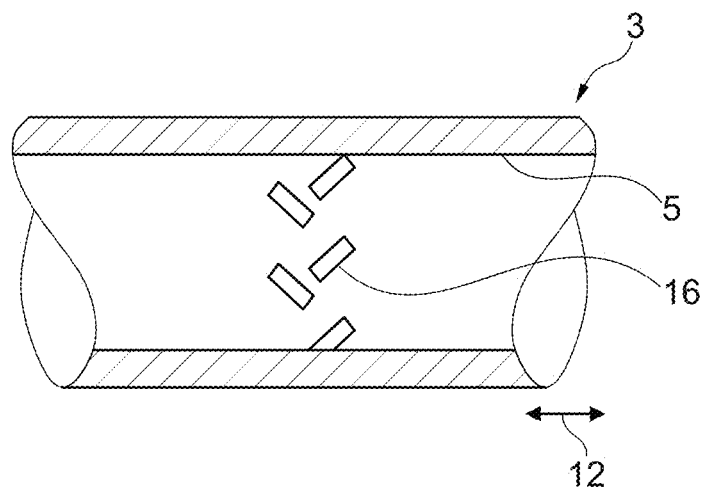
FIG. 4 shows a further sectional view through a rotor shaft according to the invention having multiple distribution elements.

In general, the distribution element 16 can also be applied to the inner lateral surface 5 of the rotor shaft 3 by means of plastic injection molding, which offers the great advantage that not only comparatively simple ring-shaped distribution elements 16 can be produced, but also, for example, inclined profiles, as shown in FIG. 4. Such a distribution element 16, which is formed from many individual elements, also ensures a flow deflection of the cooling medium 8 in the axial direction 12. If one considers FIG. 2, a rotor shaft 3 can be seen therein, in which the distribution element 16 is produced by means of embossing or tapering.

Figure 3:
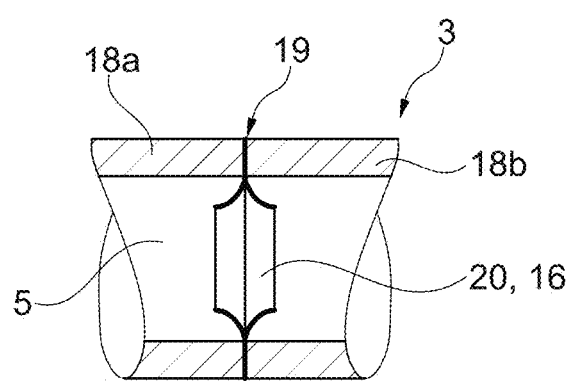
FIG. 3 shows a representation as in FIG. 2, but having a distribution element formed by a friction welding bead.

The rotor shaft 2 shown in FIG. 3 is produced from two parts 18*a* and 18*b*, which are connected to one another via a friction-welded connection 19, wherein a weld bead 20 on the inner lateral surface 5 forms the distribution element 16. Furthermore, the weld bead 20 or the distribution element 16 shown in FIG. 4 can cause the cooling medium 8 to be swirled, thereby also improving cooling.

Figure 5:
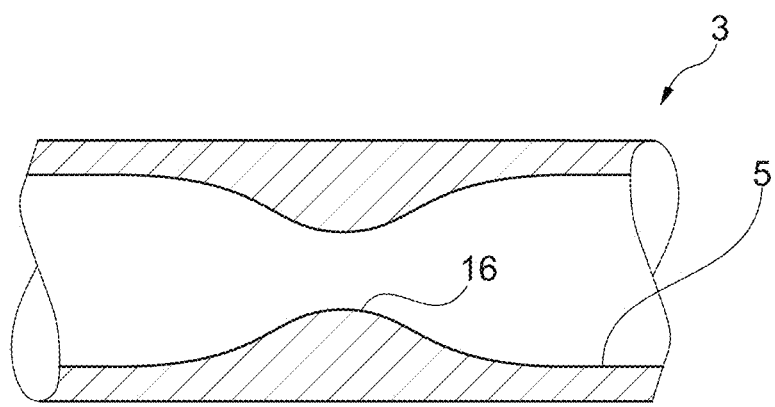
FIG. 5 shows a sectional view as in FIG. 4, but having a different distribution element.
Figure 6:
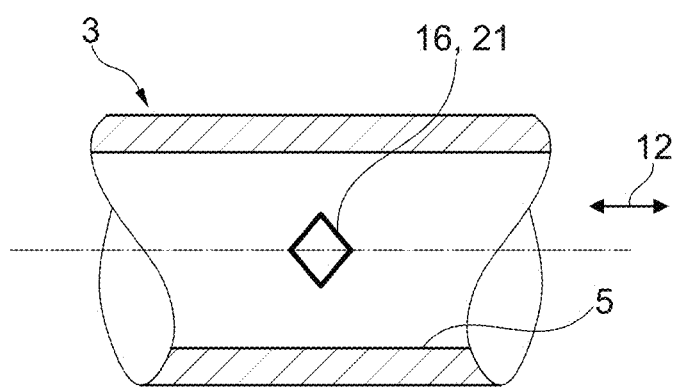
FIG. 6 shows a sectional view through a rotor shaft having a distribution element designed as a pin.

If one considers FIG. 5, it can be seen that the distribution element 16 is designed in this case as an inwardly protruding material thickening, which also makes it possible to produce the distribution element 16 comparatively simply. If one considers the distribution element 16 according to FIG. 6, a distribution element 16 can be seen there which is designed as a pin 21 leading through the rotor shaft 3, in particular as a heavy-duty roll pin. This roll pin has a rectangular or rhomboid cross section and, when rotating, causes the cooling medium 8 spraying out of the at least one opening 7 to be divided in the axial direction 12. In order to avoid an imbalance in the rotor shaft 3, at least two such pins 21 are provided on opposite sides of the rotor shaft 3.

Solely theoretically, of course, at least two openings 7 offset in the axial direction 12 can also be provided on/in the inner shaft 6, wherein in this case it is even solely theoretically possible to dispense with the distribution element 16 on the inner lateral surface 5 of the rotor shaft 3, if enough such openings 7 are provided on the inner shaft 6 over the axial length.

The at least one opening 7 on the inner shaft 6 can be introduced, for example, by means of drilling, stamping or embossing. The inner shaft 6 can be closed by means of a plug 22 at an end disk 9, 10, according to FIG. 1 at the end disk 9, wherein a cooling medium supply takes place from the right in such an inner shaft 6. The inner shaft 6 can project beyond the rotor shaft 3 and the rotor core 4 in the axial direction 12 and have bearing points 23 for mounting the rotor 1. In this case, appropriate bearings, for example ball bearings, would also be provided on the inner shaft 6 or between this and a housing (not shown) of the electrical machine 2. This would offer the great advantage that the inner shaft 6 could be used not only to cool the rotor shaft 3 but also to mount the rotor 1 at the same time.

The inner shaft 6 can be pressed through the through openings 13, 14 of the end disks 9, 10 and thus can be firmly anchored in them. The end disks 9, 10, in turn, are firmly pressed into the rotor shaft 3 or, for example, adhesively bonded in place on their outer lateral surface. An internal diameter of the distribution element 16 is usually smaller than an internal diameter of the rotor shaft 3.

All in all, using the rotor 1 according to the invention, a significantly improved, since more uniform, cooling of the same can be achieved and the power of an electrical machine 2 can be increased as a result.

The invention claimed is:

1. A rotor for an electrical machine, comprising:
a rotor shaft configured as a hollow shaft having an inner lateral surface;
a hollow inner shaft arranged in the rotor shaft, the inner shaft including at least one opening at least in one axial center for ejecting cooling medium onto the inner lateral surface of the rotor shaft to cool the inner lateral surface;
two end disks delimiting an interior of the rotor shaft in an axial direction, each of the two end disks including a central through opening through which the inner shaft is guided; and
at least one outlet opening for discharging the cooling medium disposed in at least one of (i) each of the two end disks and (ii) a lateral surface of the rotor shaft; and
a distribution element for distributing the cooling medium in the axial direction, the distribution element arranged on the inner lateral surface radially outside the at least one opening; and
wherein at least a portion of the distribution element is aligned with the at least one opening relative to the axial direction such that an imaginary plane extending perpendicular to the axial direction intersects both the distribution element and the at least one opening.

2. The rotor as claimed in claim 1, wherein:
the distribution element is configured as a ring;
the rotor shaft includes an inwardly open annular groove that is disposed on the inner lateral surface; and
the distribution element at least partially engages the annular groove of the rotor shaft and is held thereby.

3. The rotor as claimed in claim 1, wherein at least one of:
the distribution element is disposed on the inner lateral surface of the rotor shaft via plastic injection molding;
the rotor shaft is formed from two parts which are connected to one another via a friction-welded connection, and a weld bead forms the distribution element;
the distribution element is formed via at least one of embossing and tapering; and
the distribution element is configured as a pin that extends through the rotor shaft.

4. The rotor as claimed in claim 1, wherein, in a plane extending parallel to the axial direction, the distribution element has at least one of a triangular cross-sectional shape having an inwardly directed tip, a rounded cross-sectional shape, and an angular cross-sectional shape.

5. The rotor as claimed in claim 1, wherein the inner shaft is closed at an end plate via a plug.

6. The rotor as claimed in claim 1, wherein the inner shaft is pressed through the central through opening of each of the two end disks and is firmly anchored in the two end disks.

7. The rotor as claimed in claim 1, wherein an outer lateral surface of each of the two end disks is firmly pressed into the rotor shaft.

8. The rotor as claimed in claim 1, wherein:
the inner shaft protrudes in the axial direction beyond the rotor shaft and a rotor core; and
the inner shaft has bearing points for mounting the rotor in a housing of the electrical machine.

9. The rotor as claimed in claim 1, wherein the distribution element and the inner shaft are disposed spaced apart from one another in a radial direction.

10. An electrical machine, comprising a rotor, the rotor including:
a rotor shaft configured as a hollow shaft having an inner lateral surface;
a hollow inner shaft arranged in the rotor shaft, the inner shaft including at least one opening disposed at an axial center of the inner shaft for ejecting cooling medium onto the inner lateral surface of the rotor shaft to cool the inner lateral surface;
two end disks delimiting an interior of the rotor shaft in an axial direction, each of the two end disks including a central through opening through which the inner shaft is guided;
at least one outlet opening for discharging the cooling medium disposed in at least one of (i) each of the two end disks and (ii) a lateral surface of the rotor shaft; and a distribution element for distributing the cooling medium in the axial direction, the distribution element arranged on the inner lateral surface radially outside the at least one opening; and wherein at least a portion of the distribution element is aligned with the at least one opening relative to the axial direction such that an imaginary plane extending perpendicular to the axial direction intersects both the distribution element and the at least one opening.

11. The electrical machine as claimed in claim 10, further comprising a housing, wherein:

a first portion of the inner shaft projects out of the interior of the rotor shaft via extending through the central through opening of a first end disk of the two end disks;

a second portion of the inner shaft projects out of the interior of the rotor shaft via extending through the central through opening of a second end disk of the two end disks; and the rotor is mounted in the housing via the first portion and the second portion of the inner shaft.

12. The electrical machine as claimed in claim 11, further comprising a plurality of bearings arranged between the inner shaft and the housing.

13. A rotor for an electrical machine, comprising:

a hollow rotor shaft having an inner lateral surface;

a hollow inner shaft arranged in the rotor shaft, the inner shaft including at least one opening for ejecting cooling medium onto the inner lateral surface of the rotor shaft to cool the inner lateral surface, the at least one opening disposed at an axial center of the rotor shaft;

two end disks connected to opposite ends of the rotor shaft and delimiting an interior of the rotor shaft in an axial direction, the two end disks each including a central through opening through which the inner shaft is guided; and a distribution element structured and arranged to distribute the cooling medium within the rotor shaft in the axial direction;

wherein the distribution element is arranged on the inner lateral surface of the rotor shaft in alignment with the at least one opening of the inner shaft in a radial direction of the rotor shaft such that an imaginary plane extending perpendicular to the axial direction intersects both the distribution element and the at least one opening; and wherein at least one outlet opening for discharging the cooling medium is disposed in at least one of (i) each of the two end disks and (ii) a lateral surface of the rotor shaft.

14. The rotor as claimed in claim 13, wherein the distribution element is configured as a snap ring.

15. The rotor as claimed in claim 14, wherein the snap ring is disposed at least partially in an annular groove disposed in the inner lateral surface of the rotor shaft.

16. The rotor as claimed in claim 13, wherein the distribution element is configured as a heavy-duty roll pin having one of (i) a rectangular cross-section and (ii) a rhomboid cross-section.

17. The rotor as claimed in claim 13, wherein an outer lateral surface of each of the two end disks is adhesively bonded to the rotor shaft.

* * * * *